Patented May 18, 1948

2,441,602

UNITED STATES PATENT OFFICE 2,441,602

RECOVERY OF PRODUCTS FROM PENTAERYTHRITOL PROCESS WASTE LIQUORS

John E. Snow, Hasbrouck Heights, Robert H. Barth, Ridgewood, and Ralph J. Boesel, Garfield, N. J., assignors to Heyden Chemical Corporation, New York, N. Y., a corporation of Delaware No Drawing. Application November 23, 1943, Serial No. 511,484

9 Claims. (Cl. 260—637)

This invention involves a new process for the recovery of useful products, such as pentaerythritol and by-products, from the waste or end liquors produced in processes for the preparation of pentaerythritol and poly-pentaerythritols.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol. Another related hydroxylated substance obtained in somewhat smaller amounts, is white and crystalline, melts at 230–240° C., and has a hydroxyl content of 33%. This substance, which is referred to as pleopentaerythritol, is probably a mixture of dipentaerythritol, tripentaerythritol, and possibly additional related alcohols.

Dipentaerythritol, tripentaerythritol and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with other pentaerythritol residues.

In the process for producing pentaerythritol and pentaerythritol polymers, described in the pending application Serial No. 484,478, filed April 24, 1943, by John P. Remensnyder, Philip I. Bowman and Robert H. Barth, the main bulk of the desired products are removed from the reaction liquor by concentration and crystallization. However, about 10 per cent of the solid products present in the liquor, together with syrupy products and alkali formates, such as sodium formate or potassium formate, or alkaline-earth formates such as calcium formate, remain to be separated, the character of the formate depending on the specific alkali used in the process.

Processes in operation commercially for the recovery of products from these end liquors simply involve a concentration of these liquors and fractional crystallization of the mixtures to separate the alkali formates or alkaline-earth formates from the pentaerythritol. Several concentration steps are necessary, and generally only about 4 to 5 per cent of the pentaerythritol (based on the pentaerythritol in the original reaction mixture, which is approximately 40 per cent of the pentaerythritol present in the end liquor) is removed, together with 40 to 60 per cent of the formate salts. The remaining liquor is very thick and syrupy, and it has heretofore been impossible to treat it further to obtain useful products. It is generally discarded as waste material.

It is an object of the present invention to provide a process for the recovery of pentaerythritol and other products from the aforementioned type of syrupy end liquors from which major portions of the pentaerythritol and substantially all the polypentaerythritols have theretofore been removed. Further objects and advantages of the invention will be apparent to those skilled in the art to which the invention pertains.

The process of the present invention involves the discovery that substantially all the pentaerythritol can be recovered from such end liquors as follows: The end liquors are concentrated to between 50 and 90 per cent solids content and mixed with from 1 to 6 parts of a water-soluble aliphatic alcohol such as ethanol, isopropanol or n-propanol. The resulting mixture is heated to about 75 to 90° C. and will contain the pentaerythritol and large amounts of syrupy by-products dissolved in the water-soluble alcohol. The alcohol will not dissolve very much of the alkali-metal formate or alkaline-earth-metal formate. The formate salts are removed by filtering or settling in a separator of the salt-box type. Water is substantially removed from the aqueous alcohol solution and the dissolved materials, namely, pentaerythritol and a slight amount of alkali-metal or alkaline-earth-metal formate, are crystallized out by chilling.

The following is a more detailed general description of the process. The reaction end liquors are concentrated by evaporation in vacuum and mixed with a lower aliphatic alcohol such as ethyl, isopropyl or n-propyl alcohols. This mixture is refluxed to dissolve the polyhydric alcohol, and filtered hot. The formate salt present is insoluble in the alcoholic solution and is filtered off. The pentaerythritol and syrupy by-products remain in solution. The resulting filtrate is then dehydrated, either by distilling off the water and aliphatic alcohol as a binary azeotrope or by the use of benzene or toluene, which form ternary azeotropes with alcohols and water, in a suitable apparatus. The anhydrous alcoholic solution that remains is cooled for several hours and filtered. The solid product which is thus removed is a mixture of pentaerythritol and a small amount of metal formate salt. The alcohol is removed from this dehydrated filtrate by distillation under reduced pressure, and a light-colored syrup remains.

This syrup amounts to 2 to 10 per cent of the yield of pentaerythritol or polymers of pentaerythritol, and is water-soluble, possessing glycerol-like properties. It is very useful as a glycerol substitute.

The following examples illustrate the scope of the process:

*Example I.*—The mother liquor obtained from the crystallization of technical pentaerythritol is processed as follows:

Five hundred (500) parts of this filtrate were concentrated in vacuum to 235 parts by removal of water. To the resulting slurry 705 parts of isopropanol were added, and this mixture was stirred, heated and refluxed for 25 minutes. The sodium formate, which was insoluble in the alcoholic solution, was filtered off hot and washed twice with 35 parts of fresh alcohol. The sodium formate (145 parts) was dried and assayed 98.4%. To the alcoholic filtrate, which contained the pentaerythritol, syrup and some sodium formate, were added 50 parts of benzene. The alcoholic solution was dehydrated by fractionation of the ternary benzene-isopropanol-water azeotrope in an apparatus which allowed the return of the benzene-isopropanol layer to the column while the water-isopropanol layer was drawn off. After dehydration and removal of the benzene were complete, the anhydrous alcoholic solution of syrup, pentaerythritol and sodium formate was cooled to and maintained at 5° C. for 24 hours. During this time the pentaerythritol and most of the sodium formate crystallized. This mixture was filtered off and amounted to 23 parts (73.8% pentaerythritol). The alcoholic solution was then evaporated in vacuum and the residual syrup (9.6 parts) remained in the still pot.

*Example II.*—A similar quantity of pentaerythritol liquor was evaporated as described in Example I, and mixed with 705 parts of n-propanol. This mixture was heated and refluxed for 30 minutes. The sodium formate (145 parts) was filtered off and washed with fresh propanol. Fifty (50) parts of benzene were added, and the solution was dehydrated as described in Example I, except that a pressure of 500 mm. of mercury was used to keep the temperature below 70° C. On cooling, 18.8 parts of a mixture of 85% pentaerythritol and 15% sodium formate was obtained after filtering and drying. Upon evaporation of the filtrate 12.2 parts of syrup were obtained.

*Example III.*—A similar quantity of pentaerythritol liquor as described in Example I was evaporated and mixed with 705 parts of n-propanol. The filtrate from the sodium formate filtration was dehydrated by fractionation of the binary azeotrope of n-propanol and water. This was done under reduced pressure (500 mm. of mercury) to keep the boiling point around 70° C. and thereby prevent color-formation in the syrupy residue. After removal of the alcohol there was obtained 10.5 parts of residue after separation of 18.8 parts of 70% pentaerythritol by cooling and filtration.

*Example IV.*—A similar quantity of pentaerythritol liquor as described in Example I was evaporated and mixed with 705 parts of ethanol. This was filtered after heating and refluxing 30 minutes, and yielded 141.2 parts of 98.9% sodium formate. The filtrate was dehydrated as described in Example I, using the benzene-ethanol-water ternary azeotrope. Upon cooling to and maintaining the mixture at 5° C., 18.2 parts of 50% pentaerythritol were obtained, and after evaporation of the alcohol from the filtrate there were obtained 27.2 parts of syrupy residue.

*Example V.*—Ten hundred sixty-three (1063) parts of filtered liquor obtained from a pentaerythritol charge made by using potassium hydroxide as a condensing agent were concentrated to 663 parts. Fifty (50) parts of this were mixed as described in Example I, with 150 parts of isopropanol, and from this were obtained 41.3 parts of 97.6% potassium formate. Twenty-five (25) parts of the above slurry were treated as in Example I, with 150 parts of isopropanol, and there was obtained from this 18.6 grams of potassium formate which assayed 98.2%.

*Example VI.*—Five hundred (500) parts of mother liquor obtained from the crystallization of mono, di, and tripentaerythritol, made according to the process described in application Serial No. 484,478, were concentrated under vacuum to 231.6 parts and mixed with 694.8 parts of isopropanol containing 1.6% water, in the usual way. The solid sodium formate which separated was removed and dried. It weighed 152.5 parts, and was 99.2% pure. Ninety (90) per cent of the isopropanol was removed by boiling, which removed 90% of the water present originally. Approximately 21.6 parts of crude pentaerythritol containing 20.4% sodium formate crystallized from the alcoholic residue at 10° C., which contained 4.6% water. The filtrate upon evaporation yielded 21.5 parts of syrup containing 6.3% sodium formate.

Having thus described our invention, what we claim as new and desire to secure by Letters Patent is:

1. A process for the recovery of pentaerythritol and other products from an end liquor which consists of a reaction liquor obtained from the condensation of formaldehyde and acetaldehyde in the presence of an alkaline condensing agent, from which liquor the major proportions of pentaerythritol and polypentaerythritols have been removed but which liquor still contains water, metal formate, pentaerythritol and substantial proportions of syrupy organic byproducts, which comprises removing the major proportion of the water from said end liquor by evaporation, thereafter diluting and heating the resulting dried product with such a quantity of a water-soluble monohydric alcohol selected from the group consisting of ethanol, n-propanol and isopropanol that a substantial portion of the organic materials is dissolved and a substantial portion of the metal formate is not dissolved, separating the undissolved metal formate from the hot solution by filtration, removing the major proportion of the residual water from the resulting solution with a portion of the alcohol by azeotropic distillation, and subsequently allowing the solution to cool and removing the crystallized metal formate and pentaerythritol therefrom.

2. A process for the recovery of pentaerythritol and other products from an end liquor which consists of a reaction liquor obtained from the condensation of formaldehyde and acetaldehyde in the presence of an alkaline condensing agent, from which liquor a portion of the metal formate and the major proportions of pentaerythritol and polypentaerythritols have been removed but which liquor still contains water, metal formate, pentaerythritol and substantial proportions of syrupy organic byproducts, which comprises removing the major proportion of the water from said end liquor by evaporation, thereafter diluting and heating the resulting dried product with such a quantity of a water-soluble monohydric alcohol selected from the group consisting of ethanol, n-propanol and isopropanol that a substantial portion of the organic materials is dissolved and a substantial portion of the metal formate is not dissolved, separating the undissolved metal formate from the hot solution by filtration, removing the major proportion of the residual water from the resulting solution with a portion of the alcohol by azeotropic distillation, and subsequently allowing the solution to cool and removing the crystallized metal formate and pentaerythritol therefrom.

3. A process for the recovery of pentaerythritol, metal formate and other products from an end liquor obtained from the condensation of formaldehyde and acetaldehyde in the presence of a metal hydroxide condensing agent, from which liquor the major proportions of pentaerythritol and polypentaerythritols have been removed but which liquor still contains water, metal formate, pentaerythritol and substantial proportions of syrupy organic byproducts, which comprises concentrating said end liquor to a high solids content, thereafter diluting and heating the resulting concentrated product with from approximately 1 to approximately 6 times its weight of a water-soluble monohydric aliphatic alcohol selected from the group consisting of ethanol, n-propanol and isopropanol, separating the undissolved metal formate from the hot solution by filtration, thereafter removing the major portion of the residual water from the resulting solution with a portion of the alcohol by azeotropic distillation, and subsequently allowing the solution to cool and removing the crystallized metal formate and pentaerythritol therefrom.

4. A process as defined in claim 3 in which the major portion of the residual water is removed from the solution from which the undissolved metal formate has been separated by distillation of the water from the solution with a portion of the alcohol as a ternary azeotropic mixture with an aromatic hydrocarbon selected from the group consisting of benzene and toluene.

5. A process for the recovery of pentaerythritol, sodium formate and other products from an end liquor obtained from the condensation of formaldehyde and acetaldehyde in the presence of sodium hydroxide, from which liquor the major proportions of pentaerythritol and polypentaerythritols have been removed but which liquor still contains water, sodium formate, pentaerythritol and substantial proportions of syrupy organic byproducts, which comprises concentrating said end liquor to a high solids content, thereafter diluting and heating the resulting concentrated product with from approximately 1 to approximately 6 times its weight of a water-soluble monohydric aliphatic alcohol selected from the group consisting of ethanol, n-propanol and isopropanol, separating the undissolved sodium formate from the hot solution by filtration, thereafter adding an aromatic hydrocarbon selected from the group consisting of benzene and toluene, which forms a ternary azeotropic mixture with the alcohol and water, and removing the major proportion of the residual water from the resulting solution by distillation as such ternary azeotrope, and subsequently allowing the solution to cool and removing the crystallized sodium formate and pentaerythritol therefrom.

6. In a process for the production of pentaerythritol by the condensation of formaldehyde and acetaldehyde in the presence of an alkaline condensing agent, the improvement in the process of recovering the pentaerythritol which comprises concentrating the reaction mixture and removing the major portions of pentaerythritol and polypentaerythritols by crystallization, thereafter concentrating the end liquor, which still contains water, metal formate, pentaerythritol and substantial proportions of syrupy organic byproducts, diluting and heating the resulting concentrated end liquor with such a quantity of a water-soluble aliphatic alcohol selected from the group consisting of ethanol, n-propanol and isopropanol that a substantial portion of the organic materials is dissolved and a substantial portion of the metal formate is not dissolved, separating the undissolved metal formate from the solution, removing the major portion of the residual water from the resulting solution by azeotropic distillation with the alcohol, and subsequently allowing the solution to cool and removing the crystallized metal formate and pentaerythritol therefrom.

7. A process for the recovery of pentaerythritol, sodium formate and other products from an end liquor obtained from the condensation of formaldehyde and acetaldehyde in the presence of sodium hydroxide, from which liquor the major proportions of pentaerythritol and polypentaerythritols have been removed but which liquor still contains water, sodium formate, pentaerythritol and substantial proportions of syrupy organic byproducts, which comprises concentrating said end liquor to a high solids content, thereafter diluting and heating the resulting concentrated product with from approximately 1 to approximately 6 times its weight of isopropanol, separating the undissolved sodium formate from the hot solution by filtration, thereafter adding benzene and removing the major proportion of the residual water from the resulting solution by distillation as an isopropanol-water-benzene ternary azeotrope, and subsequently allowing the solution to cool and removing the crystallized sodium formate and pentaerythritol therefrom.

8. A process for the recovery of pentaerythritol, sodium formate and other products from an end liquor obtained from the condensation of formaldehyde and acetaldehyde in the presence of sodium hydroxide, from which liquor the major proportions of pentaerythritol and polypentaerythritols have been removed but which liquor still contains water, sodium formate, pentaerythritol and substantial proportions of syrupy organic byproducts, which comprises concentrating said end liquor to a high solids content, thereafter diluting and heating the resulting concentrated product with from approximately 1 to approximately 6 times its weight of n-propanol, separating the undissolved sodium formate from the hot solution by filtration, thereafter adding benzene and removing the major proportion of the residual water from the resulting solution by distillation as an n-propanol-water-benzene ternary azeotrope, and subsequently allowing the solution to cool and removing the crystallized sodium formate and pentaerythritol therefrom.

9. A process for the recovery of pentaerythritol, sodium formate and other products from an end liquor obtained from the condensation of formaldehyde and acetaldehyde in the presence of sodium hydroxide, from which liquor the major proportions of pentaerythritol and polypentaerythritols have been removed but which liquor still contains water, sodium formate, pentaerythritol and substantial proportions of syrupy organic byproducts, which comprises concentrating said end liquor to a high solids content, thereafter diluting and heating the resulting concentrated product with from approximately 1 to approximately 6 times its weight of n-propanol, separating the undissolved sodium formate from the hot solution by filtration, thereafter removing the major proportion of the residual water from the resulting solution by distillation as a n-propanol-water binary azeotrope, and subsequently allowing the solution to cool and removing the crystallized sodium formate and pentaerythritol therefrom.

JOHN E. SNOW.
ROBERT H. BARTH.
RALPH J. BOESEL.

REFERENCES CITED

The following references are of record in the file of this patent:

UNITED STATES PATENTS

| Number | Name | Date |
|---|---|---|
| 2,135,063 | Walker et al. | Nov. 1, 1938 |
| 2,270,839 | Wyler | Jan. 20, 1942 |
| 2,360,186 | Wyler | Oct. 10, 1944 |

OTHER REFERENCES

Ebert, "Ber. der Deut. Chem. Gesell.," vol. 64 B, pages 114–119 (1931).